United States Patent [19]
Livingston

[11] Patent Number: 5,394,456
[45] Date of Patent: Feb. 28, 1995

[54] IDENTIFICATION SYSTEM FOR X-RAY SENSITIVE FILM

[75] Inventor: Troy W. Livingston, Northbrook, Ill.

[73] Assignee: Livinvston Products, Inc., Wheeling, Ill.

[21] Appl. No.: 68,217

[22] Filed: May 27, 1993

[51] Int. Cl.6 .............................................. G03B 17/26
[52] U.S. Cl. .................................. 378/162; 378/165; 378/204
[58] Field of Search ............... 378/162, 163, 164, 165, 378/166, 204

[56] References Cited

U.S. PATENT DOCUMENTS

| 3,518,428 | 6/1970 | Ring ..................... 378/165 |
| 4,035,653 | 7/1977 | Karasko ............... 378/165 |
| 4,764,948 | 8/1988 | Hurwitz ................ 378/165 |

FOREIGN PATENT DOCUMENTS 2095620  8/1980  Germany .............. 378/165

Primary Examiner—David P. Porta
Attorney, Agent, or Firm—Fitch, Even, Tabin & Flannery

[57] ABSTRACT

A marker for forming identifying indicia on X-ray film is comprised of two overlapping layers of material which define a predetermined shape, with a first layer of material having first predetermined X-ray absorbing characteristics, and a second layer of material having second X-ray absorbing characteristics complementary to the X-ray absorbing characteristics of the first material, such that the combination of the two layers block a sufficient portion of the X-rays imparted to the X-ray film to form an identifying indicia on the X-ray film having good contrast. The combination of the two layers of material block a substantially greater portion of the X-rays than that blocked by either of the two materials alone. A plurality of indicia-defining layers of material are encapsulated within a clear encapsulating material having magnetic engaging means, whereby a single marker having a plurality of identifying indicia may be easily picked up and engaged with the platen containing the X-ray film.

8 Claims, 2 Drawing Sheets

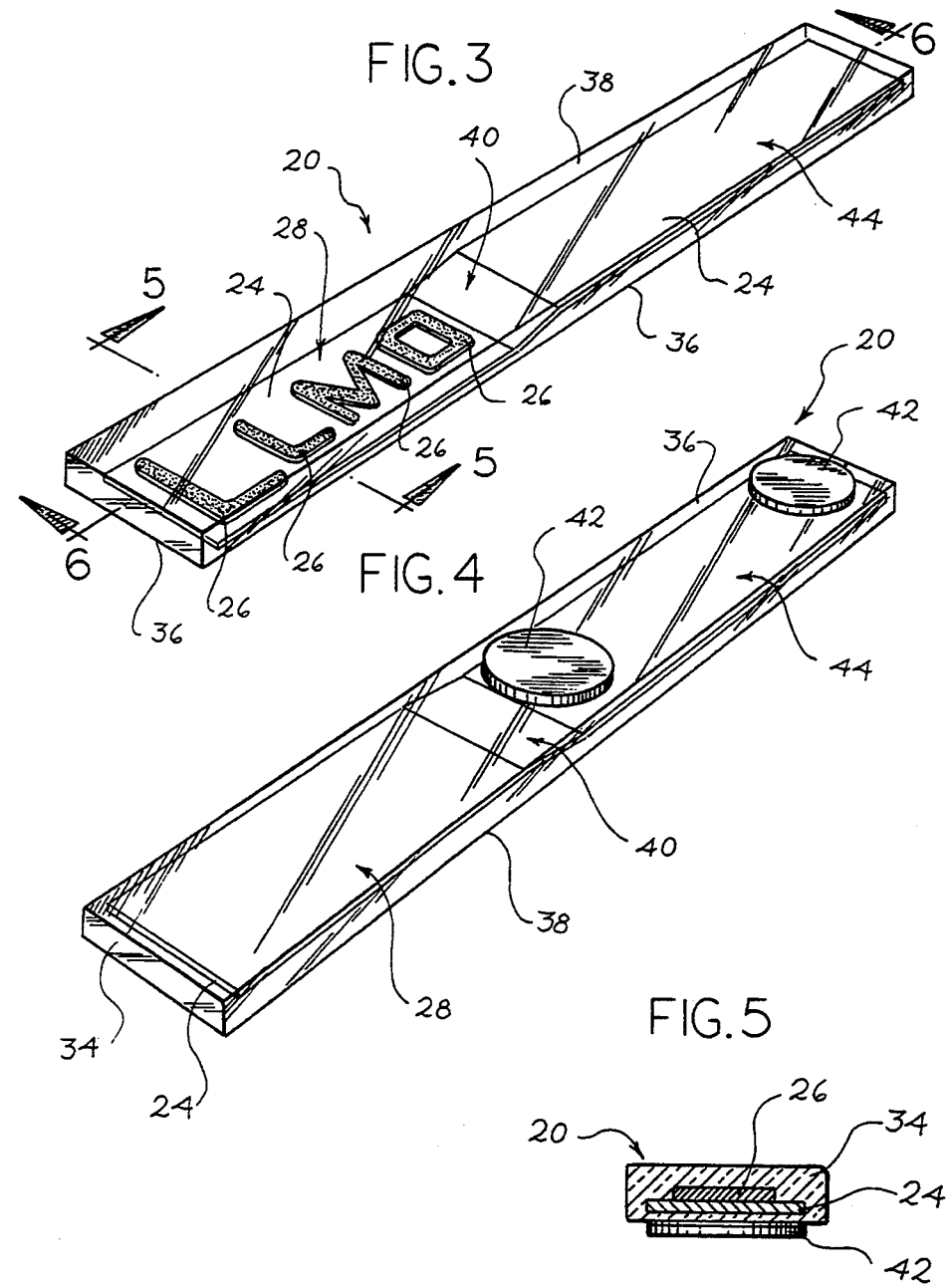
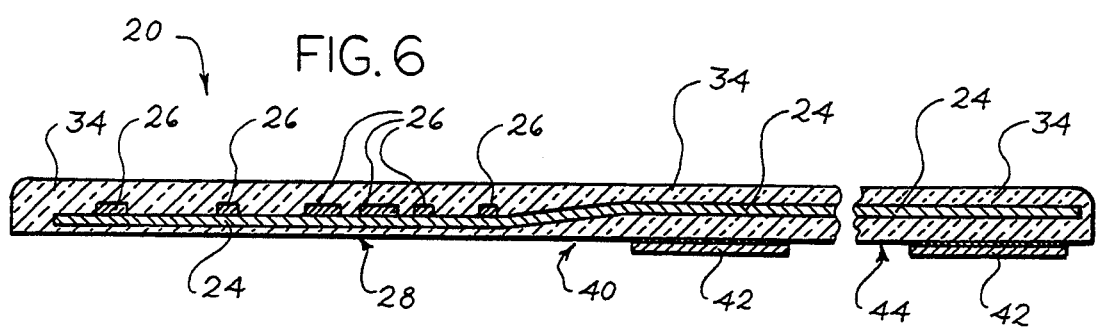

IDENTIFICATION SYSTEM FOR X-RAY SENSITIVE FILM

FIELD OF THE INVENTION

The present invention pertains to a marker for formation of identifying indicia on X-ray film.

BACKGROUND OF THE INVENTION

When making an X-ray exposure, it is known to place one or more individual lead pieces between the X-ray source and the X-ray sensitive film to block a selective portion of the X-rays imparted to the film and thereby prevent the X-rays from affecting the film over the portions of the film corresponding to the shape of the lead pieces. Typically, the lead pieces are taped in a stationary position at a location overlapping a corner of the film. The X-rays are substantially blocked over the portion of the film situated beneath the lead pieces, producing a clear or light white image on the X-ray exposure in a pattern corresponding to the X-ray pieces, with the portion of the X-ray exposure immediately surrounding the clear indicia not being blocked and therefore being dark. In this manner, the lead pieces form identifying indicia on the X-ray exposures.

For instance, to indicate on the X-ray exposure that it is a left side view in a particular shot, an L-shaped lead piece may be taped to the platen in which the film is disposed, at a location overlapping a corner portion of the X-ray sensitive film. This produces a clear L-shaped portion on the X-ray film when subjected to X-ray energy from the X-ray source, to readily identify that it is a left view in that particular X-ray exposure.

There are numerous shortcomings associated with employment of such lead markers in forming identifying indicia on X-ray film. Among these shortcomings is the toxicity of lead which may cause medical problems for persons frequently in contact with the lead. Hence, workers, who must mount and remove the lead markers to and from the film-receiving platen between each shot, and who store and clean the lead markers, are reluctant to handle the lead markers due to the medical risks they pose.

Still further, it is desirable to form thin indicia on the X-ray film since the indicia are substantially clear and, therefore, too wide or too large of such clear indicia let through too much light when observing the X-ray exposure with traditional back lighting. This results in a searchlight effect, with the back lighting shining virtually unimpeded through the large or wide clear portions of the film and shining into the viewer's eyes, and sometimes requiring the viewer to cover the indicia-bearing portion of the X-ray exposure when viewing the X-ray image. Methods for forming thin lead indica may require subjecting lead to high heat, such as in employment of laser processing, which produces toxic fumes, therefore making lead undesirable for production by such methods.

While it is possible to find a lead substitute for a small range of intensities of X-rays, there has not been an effective substitute for lead X-ray markers where the X-ray intensity varies considerably, e.g. from 8 milliamp-seconds to 300 milliamp-seconds at 25 KVA in mammographic X-rays of breasts for lumps. Small soft breasts may be X-rayed at the low end of this range. Breasts that have been subjected to radiation treatment have harder and more dense tissue requiring X-ray intensity in the upper end of this range. Materials and thicknesses that work well at the low end of the intensity range have not worked well at the high end of this intensity range. Thus, there is a need to find and develop an X-ray marker for forming identifying indicia on X-ray film when subjected to any of a wide range of intensity levels, which X-ray marker does not contain lead.

Furthermore, current markers must be taped in a desired position onto the platen in which the X-ray film is received to hold the markers in place during the X-ray exposure. Tape, which is currently employed to mount the lead markers to a platen, has been found to be a cumbersome and inaccurate mounting means. In many applications, several shots of a subject are required to be taken at different angles, and it is necessary to remove a previously-applied marker from the platen and tape a new marker to the platen between each different shot to identify each of the different angles. Considerable time is spent between each different X-ray exposure taping a plurality of different markers, suitable for properly identifying the particular X-ray exposure, to the platen. Also, it may be necessary to rotate the platen in any or each of three different planes between each of the different X-ray exposures, and the tape has been found to be an ineffective means of mounting the markers since it frequently allows the markers to shift or fall off during rotation of the platen. Accordingly, there is a need for markers which are easily mountable and detachable from a platen and will not slip during shifting of the platen.

Still further, it is necessary to frequently clean the markers. Current markers are difficult to clean due to their discontinuous surfaces, and the cotton used to wash the markers with alcohol often gets caught or snagged on the sharp corners of the markers. There is a need for a marker which meets the above requisites and which also is easy to clean repeatedly.

SUMMARY OF THE INVENTION

In accordance with one aspect of the present invention, a marker is provided which is thin and yet which also provides sufficient blocking of X-rays across a wide range of power or intensity levels to form readily visible identifying indicia on X-ray film. A composite comprised of separate, thin layers of two different materials having different X-ray absorption characteristics, provides improved absorption at the upper and lower levels of X-ray intensity.

By way of example, in experimental testing, it was found that 0.125 inch of steel alone could not absorb or block a sufficient amount of 300 milliamp-seconds at 25 KVA X-ray energy imparted to the steel to form a region of sufficient contrast on the film. Likewise, 0.125 inch of aluminum alone was also found insufficient at this power or intensity level to provide the requisite X-ray blockage for formation of readily identifiable indica on X-ray film. However, in one particular embodiment of the invention in which the marker was formed by a steel and aluminum laminate with approximately 0.030 inch of steel and approximately 0.030 inch of aluminum, at 25 KVA and 300 milliamp-seconds of X-ray power the laminate absorbed or blocked a sufficient amount of the X-ray energy imparted to the X-ray film to form an identifying indicia on the X-ray film. That is, at 300 milliamp-seconds and 25 KVA intensity or power, a quantity of the X-rays passed through the ⅛ inch thick steel and passed through the ⅛ inch thick aluminum, when these materials were used alone, without sufficient absorption of the X-rays to form the desired contrast; yet the much thinner laminate of aluminum and steel having a total thickness of only about 0.060 inch, provided sufficient X-ray energy absorption for formation of identifying indicia having good contrast on the X-ray film.

Rather than utilizing a plurality of separate letters and taping a series of separate letters to the platen to identify the exposure, the markers of the present invention have a plurality of letters or other identifying indicia mounted permanently together in a common housing. Thus, for a given X-ray exposure, only a single marker need be used.

In accordance with still another aspect of the present invention, a marker is provided which is easily mountable to, and removable from, a platen such as a buckey plate, and which will not shift upon rotation of the platen. A strip of ferrous material is mounted to the platen adjacent one of its ends, and the marker includes a pair of magnets disposed on one end of the marker in spaced relation from one another. The pair of magnets are placed onto the ferrous strip portion of the platen and magnetically adhere to the platen in a stationary position, with the portion of the marker on the opposite end of the magnets having the indicia extending over the X-ray film portion of the platen.

In accordance with a still further aspect of the present invention, the two layers of X-ray absorbing material are encapsulated within an X-ray permeable encapsulating material. The encapsulating material defines a smooth, continuous external surface which lends itself to easy and rapid cleaning with a cotton swab and alcohol between successive uses of the marker.

BRIEF DESCRIPTION OF THE DRAWINGS

In the drawings, wherein like elements are referenced alike:

FIG. 3 is an enlarged perspective view showing the top side of the marker of FIG. 1;

FIG. 4 is a perspective view showing the bottom side of the marker of FIG. 3;

FIG. 5 is a cross-sectional view of the marker taken along line 5—5 of FIG. 3; and FIG. 6 is a cross-sectional view of the marker taken along line 6—6 of FIG. 3.

DETAILED DESCRIPTION OF THE PREFERRED EMBODIMENTS

Figure 1:
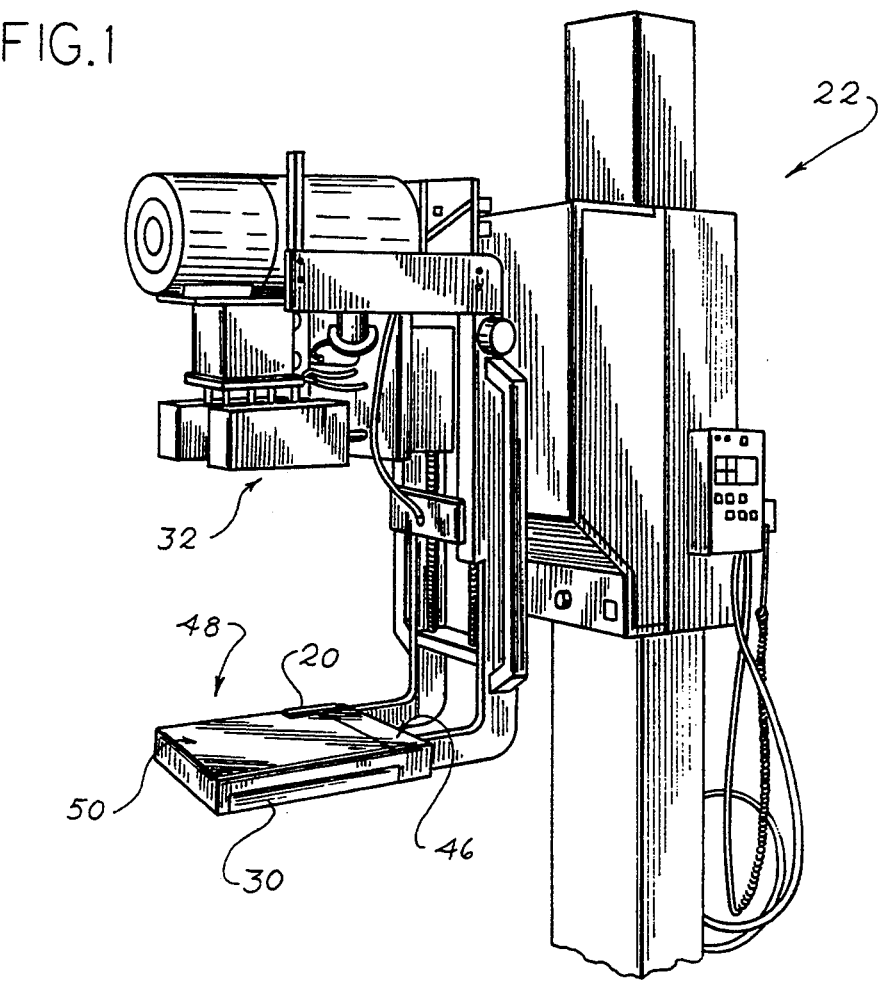
FIG. 1 is a perspective view of a marker embodying various features of the present invention mounted to a tiltable buckey plate of an X-ray machine.
Figure 2:
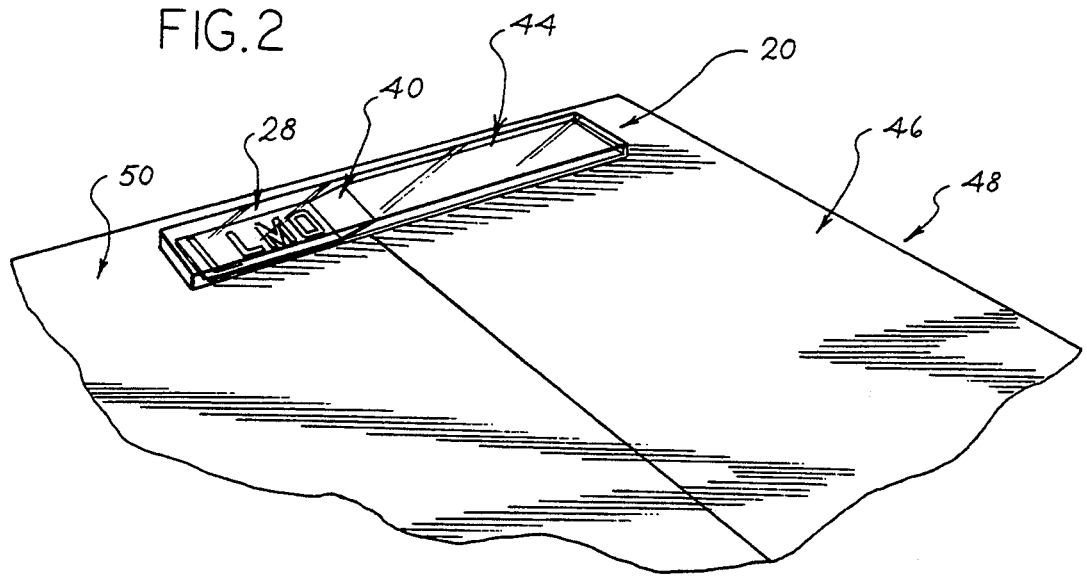
FIG. 2 is an enlarged perspective view of the marker of FIG. 1 fastened to the buckey plate.

A marker embodying various features of the present invention is illustrated in FIGS. 1–6 and referred to generally by reference numeral 20. With initial reference to FIG. 1, an X-ray machine 22 of the general type to which the present invention pertains is illustrated, with the marker 20 mounted thereto.

In the preferred embodiment, the marker 20 comprises a layer of first material in the form of an elongated aluminum strip 24, having a layer of second material of predetermined configuration in the form of steel letters or other identifying indicia 26 formed on the aluminum strip 24. The aluminum strip 24 is of substantially uniform thickness along its length, and the steel letters or other steel identifying indica 26, are preferably each of substantially the same thickness.

The marker 20 is placed with the steel, indicia-bearing portion 28 of the marker 20, and the layer of aluminum situated directly therebeneath, overlapping a portion of the X-ray film 30, which is typically a corner of the X-ray film. Hence, the steel letters 26 and the layer of aluminum 24 directly therebeneath are situated between the X-ray source 32 and the X-ray film 30. Accordingly, when the X-ray film 30 is subjected to X-rays from the X-ray source 32, a sufficient amount of the X-rays are blocked by the marker 20 over the portions having the steel letters 26 with the layer of aluminum 24 therebeneath, relative to the amount of the X-rays absorbed by the marker 20 over the portions immediately surrounding the steel letters 26, such that a relatively light image in the shape of the steel letters 26 is formed on the X-ray film 30 which is surrounded by a significantly darker background.

That is, a substantial portion of the X-rays pass through the portions of the aluminum strip 24 not having steel thereat, but the X-rays are substantially prevented from passing through the marker 20 over those portions having steel overlapping the aluminum.

One hypothesis for explaining this phenomenon is that both aluminum and steel have crystalline lattice microstructures, both of which absorb a substantial portion of X-rays over a specific frequency or wavelength range. An X-ray source of the type typically used in X-ray mammography transmits X-rays spanning a range of frequencies or wavelengths, including both lower and higher wavelengths. With one of the metals absorbing the relatively higher wavelength X-rays, and the other absorbing the relatively lower wavelength X-rays, the two metals when overlapping combine to block out substantially all wavelengths of the X-rays, such that neither high nor low wavelength X-rays pass through the double layer of material.

More particularly, X-ray film is sensitive to X-rays of all wavelengths within the X-ray spectrum, such that both high and low wavelength X-rays affect the film. With one of the layers of metal alone used to block the X-rays, either the high wavelength X-rays or the low wavelength X-rays will substantially pass through the layer of metal, with the high wavelength or low wavelength X-rays allowed to pass through the metal being sufficient to affect the X-ray film. Thus, regardless of the thickness which a single one of the metals alone is made, it will only absorb either high or low wavelength X-rays with the other, either high or low wavelength, portion of the X-rays passing through the metal. This is undesirable since it does not provide the requisite contrast of the identifying indicia on the X-ray film. However, by using two different metals, with each having a propensity for absorbing X-rays over a different portion of the X-ray spectrum, the overall absorption of the X-rays over substantially all wavelengths is realized, resulting in a sharply contrasting identifying image on the X-ray film.

The marker lends itself to use with both high and low intensity X-rays, so that separate markers for high intensity applications and separate markers for lower intensity applications are not required. When high intensity X-rays are employed, a sufficient amount of the X-rays pass through the portion of the marker having only aluminum with no steel thereat, such that the aluminum creates an area of very slight contrast on the X-ray film. The X-rays passing through the combination of aluminum and steel are substantially absorbed by the combination of the two materials such that the X-ray film is not exposed to a significant amount of X-rays over the portions situated directly beneath the steel and aluminum layers and, therefore, a very light identifying image is formed on the X-ray film in the shape of the steel letters. The light identifying indicia is readily visible against the darker area of only slight contrast caused by the aluminum.

When low intensity X-rays are employed, the total quantity of X-rays imparted to the film is less than with high energy X-rays, and the blocking of the portion of X-rays within a particular wavelength range by aluminum alone results in a more noticeable area of contrast on the X-ray film. However, with such low energy X-rays, virtually none of the X-rays pass through the combination of metals, resulting in a substantially transparent identifying image on the X-ray film which is readily visible against the gray contrast caused by the aluminum alone.

Thus, the marker 20 of the present invention is suitable for producing readily identifiable indicia on X-ray film when used with either high or low intensity X-rays.

To make the marker easy to handle and easy to clean, in the illustrated, preferred embodiment of the invention, the aluminum strip 24 and steel letters 26 are encapsulated or sealed within a clear encapsulating material 34. The encapsulating or enclosure material 34 is preferably clear to allow viewing of the steel letters 26, although other identifying marks may be made on the marker with employment of non-clear material as the encapsulating material.

To aid in making the identifying indicia of the marker readily visible, epoxy paint may be applied onto the steel letters to facilitate easy and rapid identification of the identifying indicia of the marker. The encapsulated and painted steel letters are readily visible through the clear encapsulating material. For instance, all markers 20 used to identify left side views may have a large "U" as part of the identifying indicia with all of the letters painted green; all markers used to identify right side views may have a large "R" as part of the identifying indicia with all of the letters painted red. This is to minimize operator error in using the incorrect marker to identify the X-ray film.

The encapsulating material 34 also provides a protective housing to protect the steel and aluminum lettering. The encapsulating material 34 is preferably formed of a material which does not significantly impede transmittance of X-rays therethrough. Urethane and acrylic are believed to be most suitable for use as encapsulating materials. The encapsulating material 24 is also preferably made smooth about its external surfaces to allow for easy cleaning with a cotton swab and alcohol, and also to make frequent handling of the markers comfortable. In the illustrated embodiment, the encapsulating material 34 is rectangular, to accommodate the substantially rectangular aluminum strip 24 although, manifestly, other shapes and arrangements may be employed as well. The rectangular encapsulating material 34 defines a lower side 36 and an upper side 38.

To minimize edge effects which may cause blurriness of the edges of the identifying image formed on the X-ray film, it is desirable to position the steel and aluminum indicia-forming portion of the marker as close as possible to the X-ray film, and to keep the marker stationary during X-ray imaging.

Hence, in the illustrated embodiment of the marker, as best seen in FIGS. 3 and 6, the aluminum strip 24 is situated close to the lower side 36 of the encapsulating material 34 over the indicia-bearing portion 28 of the aluminum strip, with the non-indicia-bearing, or mounting portion, 44 of the aluminum strip 24 being spaced further from the lower side 36 of the encapsulating material 34. More specifically, with reference to FIG. 6, the indicia-bearing portion 28 of the aluminum strip 24 extends substantially parallel to the lower side 36 of the encapsulating material 34, and spaced only a small distance from the lower side 36 of the encapsulating material 34.

In order to accommodate a pair of magnets 42 for securing the marker 20 in a stationary position with respect to the X-ray film, the aluminum strip 24 has a vertical offset portion 40 adjacent the indicia-bearing portion 28. The vertical offset portion 40 spaces the mounting portion 44 of the aluminum strip 24 further from the lower side 36 of the encapsulating material than the indicia-bearing portion 28 of the aluminum strip 24. A pair of magnets 42 are disposed in spaced relation from one another and attached to the underside of the mounting portion of the aluminum strip 24 so that the magnets reside between the lower side 36 of the encapsulating material 34 and the mounting portion 44 of the strip of aluminum 24. In the illustrated embodiment, the magnets 42 protrude outwardly of the encapsulating material 34; however, the magnets 42 may be fully encapsulated within the encapsulating material 34 so that they are not exposed to the cleaning agents used in cleaning the markers.

The magnets 42 magnetically engage with a strip of ferrous material disposed adjacent a marker-engaging end 46 of the buckey plate 48 to hold the marker 20 in place. That is, the marker 20 is placed onto the buckey plate 48 with its lower side 36 downward and in contact with the buckey plate 48. The marker 20 is positioned and oriented so that the mounting portion 44 of the marker 20, having magnets 42 thereat, is situated over the ferrous marker-engaging portion 46 of the buckey plate 48, and the indicia-bearing portion 28 of the marker 20 is situated over the film-receiving portion 50 of the buckey plate 48, overlapping the X-ray film 30 situated within the buckey plate 48.

Thus, only the indicia-bearing portion 28 of the marker 20, and perhaps some of the vertical offset portion 40 of the marker 20, are situated between the X-ray source 32 and the X-ray film 30. The mounting portion 44 of the marker 20 is not in the path of the X-rays and does not affect the X-ray film. The indicia-bearing portion 28 of the marker 20 is preferably positioned over a corner of the X-ray film 30. The vertical offset portion 40 of the marker 20 allows the aluminum strip 24 at the mounting portion 44 of the marker 20 to be spaced from the buckey plate 48, above the magnets 42, with the aluminum strip 24 and steel letters 26 being closely adjacent the buckey plate 48 over the indicia-bearing portion 28 of the marker 20. This allows for employment of the pair of magnets 42 on the underside 36 of the marker 20 to mount the marker 20 to the buckey plate 48, with the layers of aluminum 24 and steel 26 being situated close to the X-ray film 30 to form a sharp image on the X-ray film.

In order to minimize slippage and rotation of the marker 20, a pair of spaced-apart magnets 42 are employed. A single magnetic strip was found to allow slippage of the marker 20 about the high point of the magnetic strip, whereas the pair of separate magnets 42 spaced from one another provide significantly greater resistance to slippage and rotation of the marker 20 with respect to the buckey plate 28. This is important in buckey plates 48 used in such X-ray procedures as mammography in which the buckey plate 48 is repeatedly rotated in three different planes. For instance, as many as 15 different X-ray exposures can be taken in mammography applications, with the buckey plate rotated between the different X-ray exposures. In this regard, it is important that the marker 20 be light weight to minimize slippage of the marker.

Thus, a plurality of markers 20 incorporating the present invention may be maintained, with each of the markers 20 having different identifying indicia, such as a particular set of letters, thereon. The operator merely picks up the marker 20 having the appropriate indicia thereon to identify the X-ray to be taken, and places the marker 20 onto the buckey plate 48 as discussed above. When the X-ray exposure is taken, the X-ray film 30 will bear the identifying indicia of the marker 20 to identify the view of the X-ray film for later reference. After the X-ray exposure is taken, the marker 20 is easily manually removed from the buckey plate 48 by lifting upwardly with manual force on the marker 20. No tape or other external mounting means are required. Thereafter, another identifying marker 20, having the appropriate identifying indicia, is placed onto the buckey plate 48 in the aforementioned manner, and the nest X-ray exposure is taken. The provision of an arrangement of several identifying letters on each of the markers, rather than separate markers for each letter, together with magnetic mounting of the markers, makes changing over from one identifying indicia to another significantly easier than with prior markers.

Attempts have been made to substitute other, single materials for lead. However materials having greater radiation absorption than lead, such as gold, silver and tungsten, are significantly more expensive than lead, making them cost prohibitive for use as X-ray markers. Employment of materials having a lower X-ray absorption than lead requires that the materials be made too thick for reasonable use as markers in high X-ray intensity applications in order to provide the requisite contrast of the identifying indicia on the film. That is, depending upon the nature of the specimen being X-rayed, a selective intensity or power of X-rays will be employed which is best suited for that particular specimen, and the markers must be suitable for use over any of the wide range of X-ray intensity levels which may be employed. Unless the marker material is made sufficiently thick, the high intensity X-rays will "burn through" the material and fail to produce the requisite contrast of the identifying indicia on the X-ray film. The two-layered marker 20 of the present invention overcomes these problems.

While the invention is described with reference to an elongated steel and aluminum marker, the invention lends itself to numerous embodiments. The aluminum strip embodiment of FIGS. 1-6 is preferred since it allows for the formation of steel identifying indicia on the strip of aluminum by laser processing techniques. The preferred and illustrated letters are cut from a thin flat strip of steel by a laser beam that is controlled by a computer or computer numerical control to provide inexpensive letters. This has been found to be a low cost production method which allows the letters or other identifying indicia to be made very thin if desired. The desirability of utilizing lasers to form the identifying indicia precludes the use of certain materials, such as lead and beryllium, due to the toxic fumes which they produce. Cost and availability make other materials having desirable X-ray absorbing characteristics, such as silver and copper, less desirable than the preferred steel and aluminum embodiment. However, it is appreciated that many other materials besides aluminum may be used in place of the aluminum strip, and that many other materials besides steel may be employed as the letters. For instance, it is believed that brass may be employed for the strip or the letters. The important factor being that the strip and letters be formed of materials having different X-ray absorbing characteristics.

As stated above, other production methods which produce thick letters are undesirable since the thick identifying indicia on the X-ray film allow too much light to pass therethrough, producing a blinding searchlight effect when viewed with back lighting.

It is not necessary to utilize a strip of metal as the base, as the invention lends itself to numerous alternative embodiments. For instance, individual letters may be cut out of a steel and aluminum laminate and supported within a clear encapsulating material, such that the marker is clear over all portions except the steel and aluminum letters. Alternatively, a letter formed of steel and a separate, identical letter formed of aluminum may be maintained within an encapsulating material in spaced relation from one another, rather than being adjacent one another, with the two metal letters completely overlapping one another. Still further, rather than employing two overlapping materials, three or more layers of different material may be employed as well, without departing from the inventive concepts. Likewise, manifestly, the aluminum and steel may be switched with one another, with the aluminum situated above the steel.

The important aspect of each of the embodiments for carrying out the invention is that the X-rays are required to pass through two layers of material having different X-ray absorbing characteristics, and arranged in a predetermined configuration, prior to striking the X-ray film. The composite of the two metals provides significantly greater X-ray absorption than either of the metals alone.

By way of illustrative example only, and not of limitation, it was found that a layer of steel having a thickness of between 0.030 inch to 0.040 inch, together with a layer of aluminum having a thickness of between 0.030 inch to 0.035 inch, provides sufficient blocking of X-rays of any intensity level ranging from 8 milliamp-seconds to 300 milliamp-seconds at 25 KVA to form identifying indicia on the X-ray film having good contrast. It was found that making the aluminum strip 24 thicker than 0.035 inches produces too light a background for the identifying indicia, particularly at lower intensity levels.

While the invention has been described with regard to its preferred embodiments, which constitute the best mode known to the inventor, it should be understood that various changes and modifications may be made without departing from the scope and spirit of the invention which is intended to be set forth in the claims appended hereto.

What is claimed is:

1. A marker for use with X-ray sensitive film and disposable between an X-ray source and the X-ray sensitive film to provide predetermined identifying indicia on the X-ray sensitive film when the film is exposed to any of a predetermined range of X-ray intensities from said X-ray source, the marker comprising:

a first layer of material having predetermined X-ray absorbing characteristics for absorbing a substantial portion of X-rays;

a second layer of material having predetermined X-ray absorbing characteristics for absorbing a substantial portion of X-rays, said second layer of material overlapping said first layer of material in a predetermined pattern corresponding to the predetermined identifying indicia to be formed on the film;

said overlapping layers absorbing a sufficient portion of the X-rays at both upper and lower ends of the predetermined range of X-ray intensities to form identifying indicia on the X-ray sensitive film, the first layer of material being aluminum and the second layer of material being steel.

2. A marker in accordance with claim 1 wherein the first and second layers of material are encapsulated within an encapsulating material.

3. A marker in accordance with claim 1 further including affixing means to affix the marker to an X-ray film-receiving platen.

4. A marker in accordance with claim 3 wherein the affixing means comprises magnetic means on the marker for magnetically engaging with ferrous material of the platen.

5. A marker in accordance with claim 4 wherein the magnetic means comprises a pair of spaced-apart magnets.

6. A marker for use with X-ray film and disposable between an X-ray source and the X-ray film to provide predetermined identifying indicia on the X-ray film when the film is exposed to any of a predetermined range of X-ray intensities from said X-ray source, the marker comprising:

a base comprised of a layer of contrast-forming material having predetermined X-ray absorbing characteristics for absorbing a portion of the X-ray energy imparted to the film, to form an area of contrast on the film when the film is exposed to the X-ray energy; and a layer of indicia-forming material bonded to the base in a predetermined pattern, the indicia-forming material having X-ray absorbing characteristics complementary to the X-ray absorbing characteristics of the contrast-forming material, the combination of the contrast-forming material and the indicia-forming material absorbing a predetermined amount of X-ray energy imparted to the film sufficient to form substantially transparent identifying indicia on the X-ray film readily visible within the area of contrast, when the film is exposed to the X-rays, the base comprising an elongated strip of aluminum and the indicia-forming layer comprising steel indicia of predetermined configuration overlapping the aluminum strip.

7. A marker in accordance with claim 6 wherein the marker has platen engaging means for engaging the marker to a platen which houses X-ray sensitive film, the platen engaging means securing the aluminum and steel layers adjacent the platen.

8. An assembly for use with an X-ray machine, having a platen for engagingly receiving an X-ray sensitive film and having an X-ray source for imparting X-ray energy to the X-ray sensitive film, to form predetermined identifying indicia on X-ray sensitive film when exposed to X-rays, the assembly comprising:

ferrous material attached to the platen adjacent one end thereof;

indicia-forming material arranged in a predetermined pattern for forming predetermined identifying indicia on the X-ray sensitive film when exposed to X-rays;

encapsulating material for encapsulating the indicia-forming material therein to prevent exposure of said indicia-forming material to external elements; and at least one magnet affixed to the encapsulated indicia-forming material which is magnetically engagable with the ferrous material adjacent one end of the platen to magnetically engage the encapsulated indicia-forming material to the platen with the indicia-forming material overlapping the X-ray sensitive film, the indicia-forming material comprising a layer of aluminum and a layer of steel overlapping one another.

* * * * *